Aug. 19, 1958         W. E. LAAS ET AL              2,847,892
       BUMPER OR CUSHION FOR THE FINGER REST OF
                  MUSICAL INSTRUMENTS
              Filed Sept. 21, 1955

INVENTORS
William E. Laas
Robert F. Laas
Everett A. Laas

BY

ATTORNEY

United States Patent Office 2,847,892
Patented Aug. 19, 1958

2,847,892

BUMPER OR CUSHION FOR THE FINGER REST OF MUSICAL INSTRUMENTS

William E. Laas, Michigan City, Ind., and Robert F. Laas and Everett A. Laas, Houston, Tex.

Application September 21, 1955, Serial No. 535,544

1 Claim. (Cl. 84—380)

The present invention relates to a cushion and bumper for finger rests on musical instruments.

Various musical instruments such as clarinets, saxophones, trumpets, oboes and the like are provided with portions projecting therefrom to be engaged by a finger or fingers of the hand of the person playing the instrument so as to aid in supporting the instrument in a desired position. It can be appreciated that when the instrument is played or held for short periods or when played over extended periods of time the finger rest may tend to irritate the finger against which it abuts, and in some cases the irritation may be sufficient to impair the use of the finger in playing the instrument or may interfere with the proper handling of the instrument during playing thereof.

The present invention is directed to an invention which is relatively simple in construction, but which overcomes the above difficulties.

An object of the present invention is to provide a cushion or pad for the finger rest of a musical instrument, which cushion or pad is formed of resilient deformable material which is adapted to conform to the shape of the finger against which it fits and provide a cushion for the finger adjacent the finger rest of a musical instrument.

Still another object of the invention is to provide a device for fitting on the finger rest of a musical instrument which includes a hollow tubular body of resilient material adapted to slip or telescope over the finger rest and a pad of sponge-like material secured to the body and depending therefrom to form a cushion for abutting against the finger.

Still another object of the invention is to provide a finger rest pad for a musical instrument which is adapted to fit all sizes and shapes of finger rests normally found on musical instruments.

Other objects and advantages will become more readily apparent from a consideration of the following description and drawings wherein.

Figure 1:
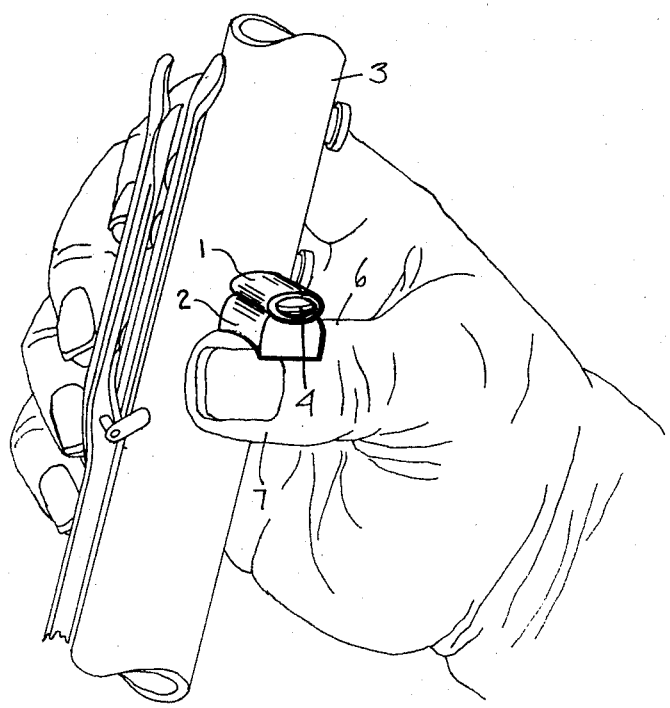
Fig. 1 is an elevationlal view illustrating the invention in position on an instrument with the thumb of the hand of the person playing the instrument positioned on the cushion.

In Fig. 1 an instrument is illustrated at 3 as having a finger rest 4 thereon. The instrument shown represents a clarinet wherein the finger rest 4 is a flat, oval shaped finger rest adapted to engage the upper side 6 of the thumb 7 while the clarinet is being played, or held.

The invention is shown in position on the finger rest 4 of Fig. 1, such invention comprising the hollow tubular body 1 and the cushion or pad 2 secured to the body and depending therefrom. The hollow tubular body 1 may be formed of resilient material such as rubber whereby it may be telescoped over the finger rest 4 with the resiliency of the material with which the body is formed serving to maintain the invention in proper alignment relative to the finger rest 4 during use thereof. The cushion or pad 2 is adapted to face in a desired direction so that it will abut the adjacent surface of the finger which would normally be engaged by the finger rest of the instrument. In the Fig. 1 illustration, the pad or cushion 2 is adapted to engage the upper side 6 of the thumb 7 and since the cushion or pad is formed of a sponge material such as foam rubber or the like, it will conform to the contour of the finger surface against which it abuts.

Figure 3:
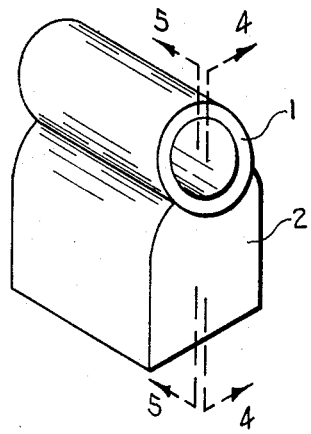
Fig. 3 is a perspective view of the invention.
Figure 4:
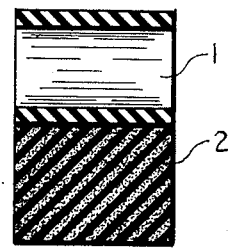
Fig. 4 is a vertical sectional view on the line 4—4 of Fig. 3.
Figure 5:
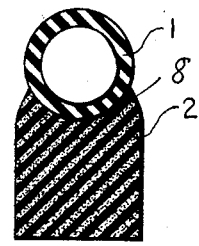
Fig. 5 is an end sectional view on the line 5—5 of Fig. 3.

The construction of the invention may be better understood by referring to Figs. 3, 4 and 5 wherein the hollow tubular body 1 is illustrated as being of a sufficient length so that it may be telescoped over any finger rest normally encountered on the various musical instruments. Of course, the length of the body may be varied, if desired, to fit special finger rests of certain musical instruments, however, we have found that the length of the body may approximate one-half inch to one and one-quarter inch, depending upon the type instrument and the finger rest thereon. Of course, the diameter of the tube or body 1 may vary depending upon the size of the finger rest over which the invention is to fit. The pad or cushion 2 is shown as being rectangular in cross-section and is secured about the outer periphery or circumference 8 of the hollow tubular body 1 for a substantial distance therealong as better illustrated in each Figs. 3 and 5. The pad or cushion 2 may be of any suitable shape and may be secured to the body 1 by any suitable means such as a rubber cement. In some situations, it may be preferable to form the device from a single piece of material and it seems obvious that the present invention contemplates this modification without departing from the scope of the invention.

The thickness of the pad 2 should be such that ample cushioning effect is provided for the adjacent finger against which it abuts, and we have found that when the pad thickness is at least the equivalent of the diameter of the hollow tubular body 1, ample cushion is provided. This relationship is illustrated in each Figs. 4 and 5 of the drawings.

Figure 2:
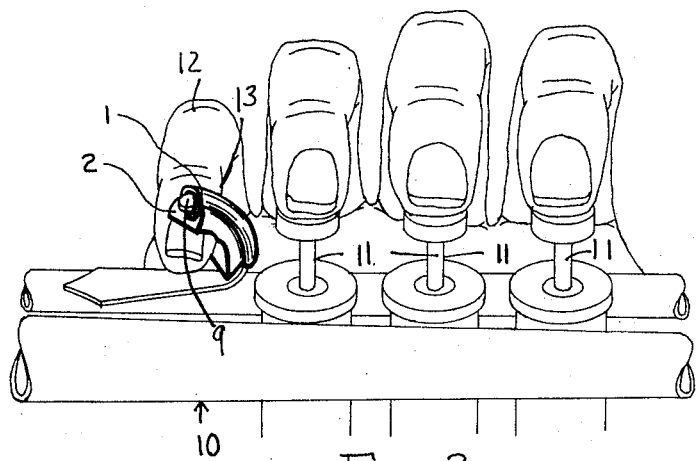
Fig. 2 is an elevational view showing the invention fitted on a different form of finger rest and with a different finger of the hand supported thereby.

In Fig. 2 the invention is illustrated as being engaged on the curved finger rest 9 of a trumpet 10. Such finger rest is positioned adjacent the valves 11 of the trumpet and is adapted to be engaged by the smallest finger 12 of the hand. The curved finger rest 9 provides a means for holding the trumpet in horizontal position while it is being played, as well as providing a means for grasping the instrument to bring it into playing position. It can, therefore, readily be appreciated that all of the weight of the instrument, or at least a great portion thereof may be carried by the smallest finger 12 by means of its engagement with the finger rest 9 of the trumpet 10. The hollow tubular body 1 is shown as being telescoped over the curved finger rest 9 with the pad or cushion 2 projecting towards the surface 13 of the finger 12 so as to cushion the finger 12 on the finger rest 9.

It is not unusual for an instrument to be in use continuously for as much as from four to six hours and sometimes even longer, and it can be readily appreciated that such extended use might cause the finger rest of an instrument to seriously irritate or rub the skin of the finger of the instrument player. The present invention provides a simple yet efficient means for overcoming this bothersome problem. The tubular body 1 is adapted to fit various shaped finger rests such as, for example, the oval shaped finger rest 4 of the instrument 3 of Fig. 1, as well as the curved finger rest 9 of the instrument 10 of Fig. 2. Not only does the body 1 fit any normal size finger rest on any musical instrument, but it maintains the pad or cushion 2 in the correct position during use of the instrument.

The present invention has been found entirely satisfactory in use and serves a long felt need in an economical yet efficient manner.

Broadly the invention relates to a finger rest cushion and more particularly to a tubular body with a cushion thereon which fits various shaped finger rests of any musical instrument.

What is claimed is:

A finger bumper and cushion for an instrument finger rest comprising, a hollow tubular body formed of resilient material whereby it may be engaged on the instrument finger rest, said body being formed of thin wall material of substantially the same diameter throughout its length a pad secured to said body on one side thereof and depending therefrom, said pad being formed of resilient material to conform to the finger adjacent the finger rest, and said pad being substantially rectangular in cross-section and substantially the same thickness as the diameter of said body, and the width of said pad being at least equal to the diameter of said hollow tubular body.

References Cited in the file of this patent

UNITED STATES PATENTS

| | | |
|---|---|---|
| 545,410 | Mishler | Aug. 27, 1895 |
| 1,395,793 | Broschart | Nov. 1, 1921 |
| 1,703,464 | Wilshire | Feb. 26, 1929 |
| 1,855,248 | Loomis | Apr. 26, 1932 |
| 2,140,239 | Lewis | Dec. 13, 1938 |

FOREIGN PATENTS

| | | |
|---|---|---|
| 14,093 | Great Britain | of 1895 |
| 463,557 | Germany | July 30, 1928 |
| 650,599 | France | Sept. 25, 1928 |